(12) United States Patent
Wood et al.

(10) Patent No.: US 7,412,564 B2
(45) Date of Patent: Aug. 12, 2008

(54) ADAPTIVE CACHE COMPRESSION SYSTEM

(75) Inventors: David A. Wood, Madison, WI (US);
Alaa R. Alameldeen, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 257 days.

(21) Appl. No.: 11/265,975

(22) Filed: Nov. 3, 2005

(65) Prior Publication Data

US 2006/0101206 A1 May 11, 2006

Related U.S. Application Data

(60) Provisional application No. 60/625,289, filed on Nov. 5, 2004.

(51) Int. Cl.
*G06F 12/06* (2006.01)
(52) U.S. Cl. .................................................... 711/118
(58) Field of Classification Search ................. 711/122, 711/118
See application file for complete search history.

(56) References Cited

U.S. PATENT DOCUMENTS

| | | | | |
|---|---|---|---|---|
| 5,671,389 A * | 9/1997 | Saliba | ......................... | 711/111 |
| 6,324,621 B2 * | 11/2001 | Singh et al. | .................. | 711/129 |
| 6,735,673 B2 * | 5/2004 | Kever | .......................... | 711/118 |
| 7,225,297 B2 * | 5/2007 | Heil | ............................ | 711/137 |
| 2002/0085631 A1 * | 7/2002 | Engwer | ....................... | 375/240 |

OTHER PUBLICATIONS

Luca Benini, Davide Bruni, Alberto Macii, and Enrico Macii, Hardware-Assisted Data Compression for Energy Minimization in Systems with Embedded Processors. In Proceedings of the IEEE 2002 Design Automation and Test in Europe, pp. 449-453, Mar. 2002.
Luca Benini, Davide Bruni, Bruno Ricco, Alberto Macii, and Enrico Macii. An Adaptive Data Compression Scheme for Memory Traffic Minimization in Processor-Based Systems. In Proceedings of the IEEE International Conference on Circuits and Systems, ICCAS-02, pp. 866-869, May 2002.
Daniel Citron and Larry Rudolph. Creating a Wider Bus Using Caching Techniques. In Proceedings of the First IEEE Symposium on High-Performance Computer Architecture, pp. 90-99, Feb. 1995.
Matthew Farrens and Arvin Park. Dynamic Base Register Caching: A Technique for Reducing Address Bus Width. In Proceedings of the 18th Annual Internatonal Symposium on Computer Architecture, pp. 128-137, May 1991.

(Continued)

*Primary Examiner*—Kevin L Ellis
(74) *Attorney, Agent, or Firm*—Boyle Fredrickson, S.C.

(57) ABSTRACT

Data in a cache is selectively compressed based on predictions as to whether the benefit of compression in reducing cache misses exceeds the cost of decompressing the compressed data. The prediction is based on an assessment of actual costs and benefits for previous instruction cycles of the same program providing dynamic and concurrent adjustment of compression to maximize the benefits of compression in a variety of applications.

30 Claims, 2 Drawing Sheets

OTHER PUBLICATIONS

Peter Franaszek, John Robinson, and Joy Thomas. Parallel Compression with Cooperative Dictionary Construction. In Proceedings of the Data Compression Conference, DCC '96, pp. 200-209, Mar. 1996.

Erik G. Hallnor and Steven K. Reinhardt. A Fully Associative Software-Managed Cache Design. In Proceedings of the 27th Annual International Symposium on Computer Architecture, pp. 107-116, Jun. 2000.

Erik G. Hallnor and Steven K. Reinhardt. A Compressed Memory Hierarchy Using an Indirect Cache. Technical Report CSE-TR-488-04, University of Michigan, Jun. 2004.

Morten Kjelso, Mark Gooch, and Simon Jones. Design and Performance of a Main Memory Hardware Data Compressor. In Proceedings of the 22nd EUROMICRO Conference, Sep. 1996.

* cited by examiner

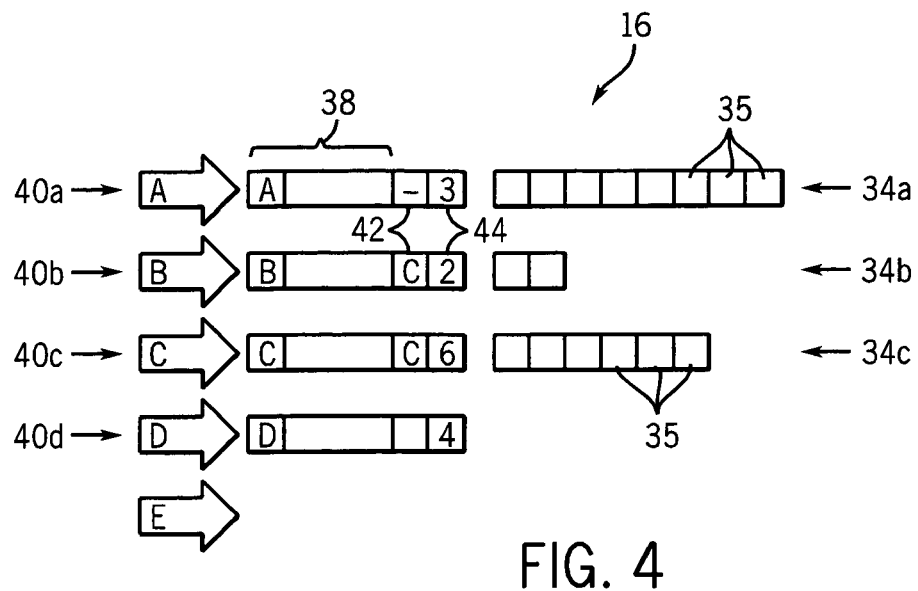
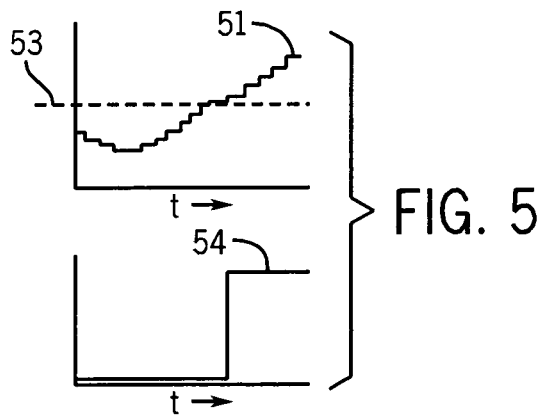
FIG. 5
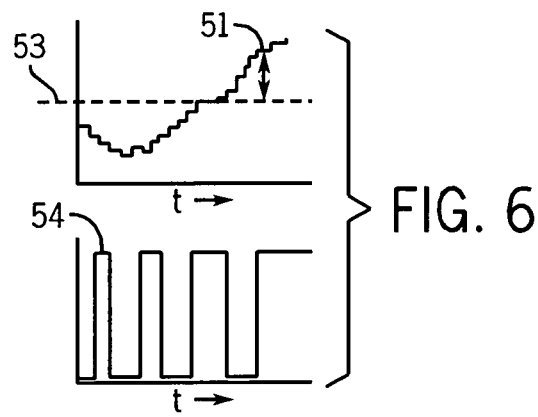
FIG. 6
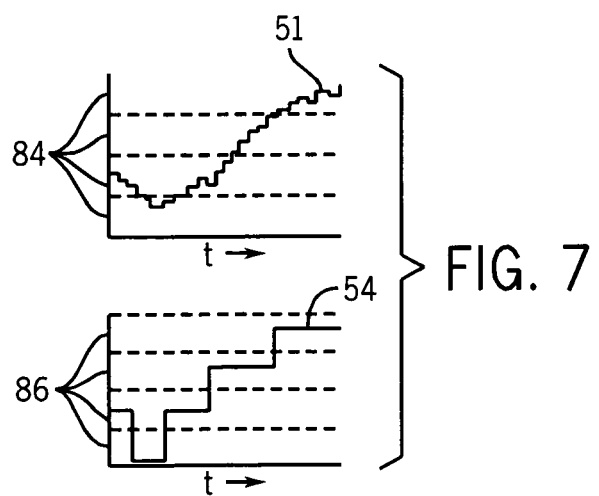
FIG. 7

ADAPTIVE CACHE COMPRESSION SYSTEM

CROSS-REFERENCE TO RELATED APPLICATIONS

This application claims the benefit of U.S. provisional application 60/625,289 filed Nov. 5, 2004 and hereby incorporated by reference.

STATEMENT REGARDING FEDERALLY SPONSORED RESEARCH OR DEVELOPMENT

This invention was made with United States government support awarded by the following agencies: NSF 0324878. The United States has certain rights in this invention.

BACKGROUND OF THE INVENTION

The present invention relates to cache memories for electronic computers and, in particular, to a cache system providing for compression of cache data.

The speed at which computers may execute a program is constrained by the time it takes for data and instructions to be transferred from the computer memory to the computer processor. One method of reducing this "memory latency" is through the use of cache memories which are small, high-speed memories with high bandwidth connections to the processor. Data and instructions expected to be needed by the processor are fetched from the main computer memory into the cache memory. When the data is required by the processor, it is readily and quickly available from the cache memory without the need to access the main computer memory.

A larger cache memory increases the likelihood that necessary data is stored in the cache memory and that the time penalty of accessing the main computer memory can be avoided. The costs of larger cache memories, and the need to provide a high bandwidth connection to the processor, however, practically limits the size of the cache memory.

One method of increasing the effective storage capacity of the cache memory, with minimal increases in the area of the cache memory, is by compressing the data in the cache memory. Unfortunately, compressing the cache data slows access to the cache data because the data must be decompressed before it can be used by the processor. This decompression step is typically in the critical time path when data is being requested by the processor.

Whether compression increases the execution speed of a particular program will depend on whether the time savings in reducing cache misses (where needed data is not in the cache) compares favorably with the overhead of cache decompression. Generally, this will depend on the particular program being executed and thus can help or hurt computer performance in different situations.

SUMMARY OF THE INVENTION

The present invention provides an adaptive cache compression system which changes the degree of compression of cache data based on a dynamically updated prediction as to whether the compression will speed the performance of execution of the program. The prediction is based on an assessment of historical compression costs and benefits from execution of the current program and thus provides a compression system that works with a wide range of applications.

The ability to evaluate the costs and benefits of compression for a particular program, during execution of that program, relies on the insight that preserving information about desired cache lines and their compressed sizes (whether or not they are compressed) allows each cache transaction to be evaluated for the alternative cases of compression or not compression (or different degrees of compression). An accumulation of costs and benefits for the executing program steers the predictor toward a more or less aggressive compression policy.

Specifically, the present invention provides a cache system for use with an electronic computer having a cache memory. This system has a data compressor controllably compressing data to be stored in the cache memory and a predictor communicating with the data compressor to control compression of the data to be stored in the cache memory according to a predicted effect of the compression of data on a speed of execution of a program using the data.

It is thus one object of at least one embodiment of the invention to provide a cache compression system with superior performance over alternatives of always compressing cache data and never compressing cache data. By dynamically adjusting compression, the present invention provides a system that works with a variety of different types of programs.

The data compressor may be switched by the predictor between compressing or not compressing the data to be stored in the cache. In one case, the predictor may create a prediction value and when the prediction value is above a predetermined threshold, the data compressor may compress the data and when the prediction value is below the predetermined threshold, the data compressor may not compress the data.

Thus it is an object of at least one embodiment of the invention to provide a simple method of controlling the compressor that can be dynamically responsive to changes in the benefits of compression.

Alternatively, the predictor may create a prediction value and the predictor may control the data compressor to switch between the compressing of the data and not compressing the data to create an average compression being a semi-continuous function of the prediction value.

Thus it is an object of at least one embodiment of the invention to provide for smoother control of compression that may allow for more precise control strategies.

Alternatively, the data compressor may be switched by the predictor between multiple degrees of compression having different latency.

Thus it is another object of at least one embodiment of the invention to provide a method of using a range of different compression techniques to optimize the compression of the cache.

The predictor may compare a cost and benefit of compression over a predetermined previous time.

It is thus one object of at least one embodiment of the invention to allow prediction values to be derived from the actual execution of a given program on the processor and thus to be sensitive to changes in the efficiency of compression during execution of the program.

The predictor may be a counter tallying historical time saved and lost attributable to compressed data in the cache memory.

It is thus another object of at least one embodiment of the invention to provide a simple method of evaluating historical data on costs and benefits of compression.

The predictor may tally a time saved when data accessed would not have been held in the cache but for compression, and may tally a time lost when the data is compressed, but would have been held in the cache regardless of compression.

Thus it is another object of at least one embodiment of the invention to provide an actual assessment of the effects of compression on memory latency.

The predictor may tally a time saved when data was not in the cache but could have been in the cache with more compression.

Thus it is another object of at least one embodiment of the invention to provide a prediction that is sensitive to potential as well as actual benefits from compression.

The cache may include a tag indicating a compressed size of the data regardless of whether the data is compressed.

Thus it is another object of at least one embodiment of the invention to preserve data necessary to assess the potential effect of compression that was not performed.

The data compressor may identify common data patterns and replace them with abbreviated patterns to compress the data. For example, low magnitude numbers, zero values, and repeatable data blocks may be replaced with shortened patterns.

It is thus an object of at least one embodiment of the invention to provide a system that works with a variety of different compression systems.

The system may include a second cache memory reading from the cache memory where the cache memory. The system may further include a victim cache holding data expelled from the second cache.

Thus it is another object of at least one embodiment of the invention to provide a compression system that may be readily implemented in existing architectures and may make use of a second cache and victim cache to decrease the decompression burden by holding decompressed information in a decompressed form.

These particular objects and advantages may apply to only some embodiments falling within the claims and thus do not define the scope of the invention.

BRIEF DESCRIPTION OF THE FIGURES

FIG. 4 is a block diagram similar to FIG. 3 showing an example cache structure used to describe operation of the present invention;

FIG. 5 is a graph of prediction value as a function of time which may be compared to a threshold value to provide two levels of compression control;

FIG. 6 is a figure similar to that of FIG. 5 showing semi-continuous control of compression as a function of the magnitude of the predictor value; and FIG. 7 is a figure similar to that of FIGS. 5 and 6 showing output of the predictor when multiple different compression algorithms are available

DETAILED DESCRIPTION OF THE PREFERRED EMBODIMENT

Figure 1:
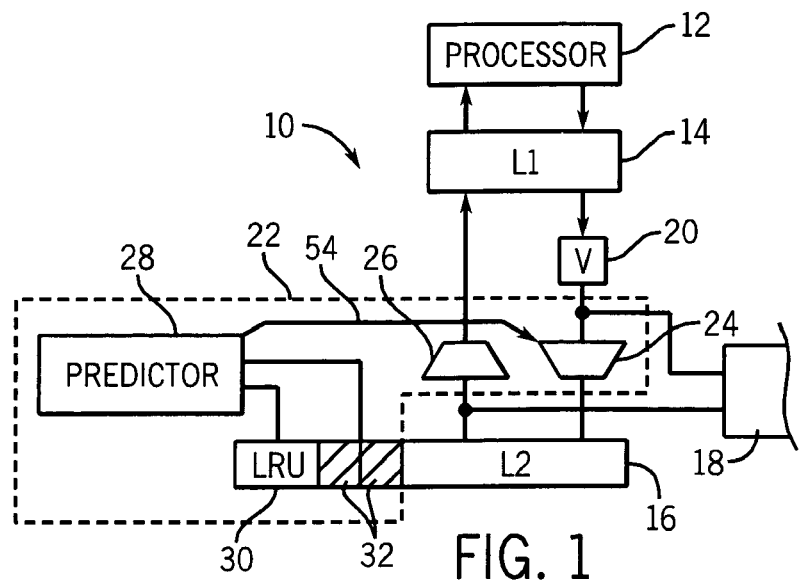
FIG. 1 is a block diagram of a standard computer architecture having an L1 and L2 cache and further including a predictor circuit, compressor, and decompressor for implementing adaptive cache compression per the present invention.

Referring now to FIG. 1, a computer system 10 may include a processor 12 operating on stored program instructions and data.

The instructions and data may be provided to the processor 12 from an L1 cache 14 which may have separate sections for instructions and data according to methods well known in the art. For clarity, instructions and data will henceforth be referred to collectively as data.

The L1 cache may in turn receive data from the L2 cache 16 or directly from a main memory 18. The L1 cache may expel data to a victim cache 20. The victim cache 20, in turn, may expel data to the L2 cache 16 or to main memory 18.

Normally, the communication between the processor 12 and main memory 18 takes longer than the communication between the processor 12 and the L2 cache 16. Accordingly, the cache L2 will be loaded from main memory 18 to try and reduce access time for requests by processor 12 of data from main memory 18.

The L2 cache may include a last read unit "LRU" 30 of a type known in the art and indicating the cache lines of cache L2 that have been most recently requested. The LRU 30 provides bits associated with each cache line of the L2 cache 16 indicating the order in which they were last read. Generally cache lines lower in order in the LRU 30 will be expelled when new data is brought in favor of cache lines higher in that order. The L2 cache may also include another cache replacement algorithm of a type known in the art that is not necessarily LRU, yet that maintains order of replaced cache lines, for example, an approximate LRU replacement policy or other similar replacement algorithms known in the art.

Each of the above described processors, L1 cache 14, L2 cache 16 with LRU 30, victim cache 20, and main memory 18, and their operation will be understood to those of ordinary skill in the art.

Referring still to FIG. 1, the present invention adds a cache compression system 22 to the above-described architecture. The cache compression system includes: a compressor 24, a decompressor 26, a predictor 28 and additional compression information data 32 in the L2 cache 16. The compressor 24 is placed between the victim cache 20 and both of the L2 cache 16 and main memory 18, and the decompressor 26 is placed between both of the main memory 18 and L2 cache and the L1 cache.

In the simplest embodiment of the invention, the decompressor 26 and compressor 24 use a single method of compression and corresponding decompression. As will be discussed below, however, the decompressor 26 and compressor 24 may alternatively select from multiple compression and decompression algorithms providing for different amounts of compression and offering different latency, being a measure of the time or instruction cycles required for the compression or decompression operation.

Referring still to FIG. 1, the compressor 24 is controlled by the predictor 28 which may switch compressor 24 from a compression mode to a bypass mode in which data passes through the compressor 24 without modification. In this way, data from the L2 cache may pass through the compressor 24 without modification or with compression. Likewise, data passing from the victim cache 20 may pass through the compressor 24 either without modification or with compression. Note, that the predictor 28 doesn't need to determine whether to bypass the decompressor 26. Data is always decompressed if and only if it was stored in compressed form. Thus, the predictor 28 need only determine whether or not to compress data before storing it in the cache. When decompression is not required, the decompressor 26 provides a bypass mode where no decompression is provided and data is rapidly pass by the decompressor 26 without modification or significant delay.

The predictor 28 receives information from the LRU 30 of the L2 cache 16 and from the compression information data 32 added to the L2 cache 16. The compression information data 32, as will be described below, provides an indication of whether a cache line is compressed and the length of that cache line if were compressed.

Generally, the predictor 28 monitors access to data of L2 cache 16 to predict whether the process of compressing and decompressing data in the L2 cache 16, using compressors 24 and decompressor 26, will improve the execution speed of a currently executing program. The predictor 28 switches between storing and not storing output of the compressor 24 (that is, between compression and bypass mode) based on that prediction to gain the benefits of compression when the prediction suggests that compression will not be offset by a slowing execution speed of the program through the extra costs of decompression.

Figure 3:
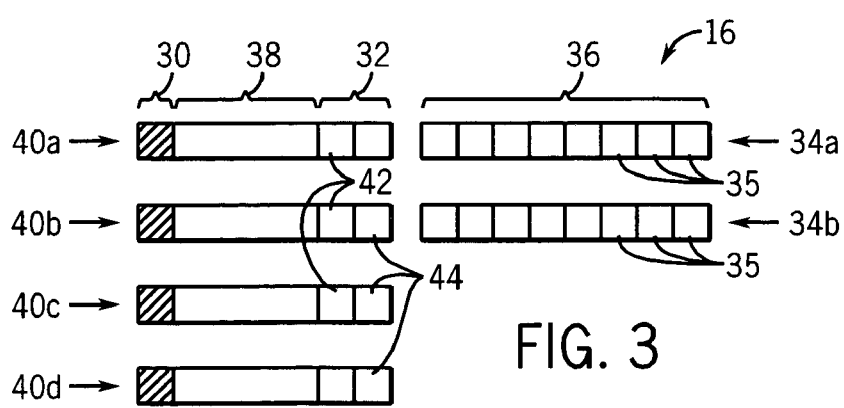
FIG. 3 is a schematic block diagram of a single cache set for the L2 cache of FIG. 1 showing the additional tag data and the expanded lines of tag memory.

Referring now to FIG. 3, the L2 cache may provide a data section 36 arranged as cache lines 34a and 34b. Generally, a cache line 34 will be loaded in a single operation from the main memory 18. Each cache line 34 is composed of a number of data segments 35 (in this case, eight data segments 35) representing an arbitrary division of the cache line 34 into compressible increments.

Each cache line 34 is associated with one of tags 40a-d in the L2 cache 16. As will be understood in the art, the tags 40 hold information about the address in main memory 18 of their corresponding cache line 34 in an address block 38. Accordingly, when a request for data arrives from the processor 12 at the L2 cache 16, the address of that data is reviewed against the addresses stored in the address block 38 to see if the relevant data is in cache lines 34 of the L2 cache 16. If the requested data is not in the L2 cache 16, a miss occurs and the data must be obtained at a greater time penalty from memory 18.

In the present invention, there are more tags 40 than cache lines 34, accommodating the fact that the present invention may compress multiple lines of data into fewer cache lines 34. In the example structure of L2 cache 16, four cache lines of data can be compressed into the two cache lines 34a and 34b as recorded by the information of four tags 40a-d.

This compression will require that the L2 cache 16 incorporates a decoupling between the tags 40a-d and the cache lines 34 so that data associated with a given tag 40 may be arbitrarily distributed between the cache lines 34. Techniques for such decoupling are described generally in: Andre Seznec, Decoupled Sectored Caches, *IEEE Transactions on Computers*, 46(2): 210-215 February 1997; Andre Seznec, Decoupled Sectored Caches, *IEEE Transactions on Computers*, 46(2):210-215, February 1997; Erik G. Hallnor and Steven K. Reinhardt, A Fully Associative Software-Managed Cache Design, *Proceedings of the 27th Annual International Symposium on Computer Architecture*, pages 107-116, June 2000; Erik G. Hallnor and Steven K. Reinhardt, A Compressed Memory Hierarchy using an Indirect Index Cache, Technical Report CSE-TR-488-04, University of Michigan, 2004; Jang-Soo Lee, Won-Kee Hong, and Shin-Dug Kim, Adaptive Methods to Minimize Decompression Overhead for Compressed On-chip Cache, *International Journal of Computers and Application*, 25(2), January 2003; Jang-Soo Lee, Won-Kee Hong, and Shin-Dug Kim, Design and Evaluation of a Selective Compressed Memory System, *Proceedings of International Conference on Computer Design (ICCD'99)*, pgs. 184-191, October 1999; Jan-Soo Lee, Won-Kee Hong, and Shin-Dug Kim, An On-chip Cache Compression Technique to Reduce Decompression Overhead and Design Complexity, *Journal of Systems Architecture: the EUROMICRO Journal*, 46(15):1365-1382, December 2000; David Chen, Enoch Peserico, and Larry Rudolph. A Dynamically Partitionable Compressed Cache. In *Proceedings of the Singapore-MIT Alliance Symposium*, January 2003; and R. E. Kessler, The Alpha 21264 Microprocessor, *IEEE Micro*, 19(2):24-36, March/April 1999, all hereby incorporated by reference.

Referring still to FIG. 3 as mentioned above, the present invention adds to each tag 40a through 40d compression information data 32. This compression information data 32 includes a compression state bit 42 indicating whether the data associated with the tag 40 is compressed or uncompressed, and compression size bits 44 indicating the size of the data in segments 35 if the data associated with the tag 40 were to be compressed. The compression size bits 44 provide this information whether or not the data is actually compressed, information which may be determined only by the compression state bit 42.

Figure 2:
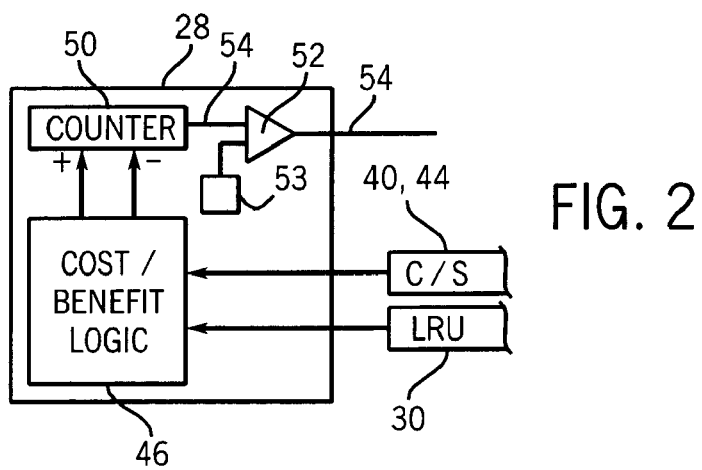
FIG. 2 is a block diagram of the predictor circuit providing control of the compressor and decompressor of FIG. 1 based on information from the LRU stack and additional tag data associated with the L2 cache.

Referring now to FIGS. 1 and 2 as mentioned, the operations of compression and de-compression of decompressor 26 and compressor 24 will take time, and thus impose a time penalty on the access of data by processor 12 from L2 cache 16. On the other hand, compression of cache lines 34, that allows additional lines of data to be stored in the L2 cache 16, can decrease the number of cache misses which also carries a time penalty. Whether compressing the data of the L2 cache 16, makes sense, on a line-by-line basis, is determined by a cost-benefit logic circuitry 46 forming part of the predictor 28. This cost-benefit logic circuitry 46 receives the compression state bit 42 and compression size bits 44 and the ordering of cache lines 34 of the bits from the LRU 30 to evaluate the costs and benefits of compressing the data of the L2 cache.

This evaluation, by the cost-benefit logic circuitry 46, which will be described in detail below, can be performed upon every request of data by the processor 12. Upon each request, the cost-benefit logic circuitry 46 will determine whether there was a benefit from compression of data of the L2 cache 16, for example, if the data is only in the cache because of compression or if the data could have been in the cache with more compression. Likewise the cost-benefit logic circuitry 46 will determine whether there was a cost from compression of data of the L2 cache 16 because the data would have been in the L2 cache 16 regardless of compression and yet was compressed invoking a decompression penalty. The cost-benefit logic circuitry 46 also assesses cases where there is neither cost nor benefit.

The cost-benefit logic circuitry 46, based on this evaluation, provides a cost value or benefit value to a saturating counter 50 which effectively keeps a running total of costs and benefits (if any) to the limits of the counter 50.

The output 51 of the counter 50 is provided to a compression controller 52 which may operate in a variety of different modes, to be described, to produce a compression control output 54. The compression control output 54 is provided to the compressor 24 controlling whether it is in bypass mode or compression mode and thus whether a given cache line 34 (shown in FIG. 3) is stored in a compressed or uncompressed mode.

Referring now to FIG. 4, the calculation of the costs or benefits provided by the cost-benefit logic circuitry 46 of FIG. 2 may classify a given data request into one of five categories according to the tag address block 38, compression state bit 42 and compression size bits 44, and the ordering of cache lines 34 of the bits from the LRU 30 per the following examples. In these examples, it will be assumed that the L2 cache 16 may store data associated with three addresses A, B and C in tags 40a, 40b and 40c, respectively. Furthermore, it will be assumed that the processor has accessed address A most recently, address B next most recently, and address C more recently than address D.

The data of address A may be uncompressed and stored in eight segments 35 of cache line 34a. The tag 40a will indicate at compression state bit 42 that the data is uncompressed and compression size bits 44 that the data, if compressed, would comprise three segments 35.

The data of address B may be compressed and stored in two segments 35 of cache line 34b. The tag 40b will indicate at compression state bit 42 that the data is compressed and compression size bits 44 that the data, when compressed, comprises two segments 35.

The data of address C may be compressed and stored in six segments 35 of cache line 34c. The tag 40c will indicate at compression state bit 42 that the data is compressed and compression size bits 44 that the data, when compressed, comprises six segments 35.

The data of address D may not be stored in the L2 cache 16, but recorded in the tag 40d (per its address) and at compression state bit 42 that the data is compressed and at compression size bits 44 that the data, if compressed, would comprise four segments 35.

An Unpenalized Hit

Referring to the first row of Table 1 below and FIG. 4, the first case of an unpenalized hit occurs upon a request for the data of address A. In this case, the LRU 30 indicates that the data of address A would be in the L2 cache 16 regardless of compression because its order in the LRU 30 (of 1) is less than the Physical Cache Limit value of 2, being the number of lines of data that could be stored if no date were compressed. Because the data is in cache line 34a in uncompressed form, it may be provided directly to the processor 12 without decompression, invoking no decompression penalty. The cost-benefit logic circuitry 46 provides a zero value to the saturating counter 50 causing it neither to increment nor decrement.

A Penalized Hit

The next case of a penalized hit per the second row of Table 1 may occur with a request for the data of address B. Here again, the LRU order of the data of address B (two) is within the Physical Cache Limit, and thus the data of address B would have been in the L2 cache 16 regardless of the compression of other data. Yet because the data of address B is compressed as indicated by compression state bit 42, a decompression penalty is incurred and there is a compression cost as indicated by $C_1$. Generally this compression cost will be a number of instruction cycles or other time value or proportional to the same.

An Avoided Miss

An avoided miss is shown in the third line of Table 1 and is illustrated by a request for the data of address C. Here, the data of address C is in the L2 cache 16 although the order of the data of address C is three in the LRU 30 and thus beyond the Physical Cache Limit of 2 described above. Accordingly, the data could only have been in the L2 cache because of compression, resulting in a compression benefit $B_1$.

An Avoidable Miss

An avoidable miss is shown in the fourth line of Table 1 and is illustrated by a request for the data of address D. Here, the data of address D is not the L2 cache 16 although it could have been if all data of the L2 cache 16 had been compressed because the sum of all compressed data (indicated by the sum of the compression size bits 44 for all data in the L2 cache 16) and the compression size bits 44 of the data of address D (equal to fifteen segments 35) is less than or equal to the Compressed Cache Limit of 16 segments 35. Accordingly, the data could only have been in the L2 cache because of compression, resulting in a compression benefit $B_2$. Generally benefit $B_2$ may not be the same as benefit $B_1$. Note, the caption: "Line Less than Compressed Cache Limit?" in the fifth column of Table 1 refers to a determination of whether, for a block at LRU stack distance D, the sum of the compressed sizes of all blocks from 1 to D is less than or equal to

TABLE 1

| Case | Line in L2? (address block 38) | Line less than or equal to Physical Cache Limit? (LRU 30) | Line order greater than Tag Limit? | Line less than Compressed Cache Limit? (compression size bits 44) | Data Compressed? (compression state bit 42) | Cost or Benefit |
|---|---|---|---|---|---|---|
| Unpenalized Hit | Yes | Yes | — | — | No | 0 |
| Penalized Hit | Yes | Yes | — | — | Yes | $C_1$ |
| Avoided Miss | Yes | No | — | — | — | $B_1$ |
| An Avoidable Miss | No | — | — | Yes | — | $B_2$ |
| An Unavoidable Miss | No | — | Yes | — | — | 0 | the number of segments. Only sum those blocks with LRU stack depth less than or equal to the block in question are considered

An Unavoidable Miss

An unavoidable miss is shown in the fifth line of Table 1 and is illustrated by a request for the data of address E. Here, the data of address E is not the L2 cache 16 and could not have been even if all data of the L2 cache 16 had been compressed because there are no remaining tags 40. Again the cost-benefit logic circuitry 46 provides a zero value to the saturating counter 50 causing it neither to increment nor decrement. A second type of unavoidable miss (not shown) is when the address of E is in the L2 cache but the data would not have fit in the L2 cache even with proper compression, that is, for the stack distance E, the sum of the compressed sizes of all blocks from 1 to E was greater than the number of segments Referring to FIG. 5, as described, the output from the cost-benefit logic circuitry 46 is provided to a counter 50 whose output 51 provides a running total of the historical costs and benefits of compression prepared by the cost-benefit logic circuitry 46.

A threshold 53 may be established within the range of the output 51 of the saturating counter 50 and provided to the compression controller 52 operating as a comparator. When the output 51 rises about the threshold 53 indicating net benefits to compression, the compression control output 54 of the compression controller 52 may provide a signal (shown here as high state) to the compressor 24 to compress incoming cache lines. Conversely, when the output 51 falls below the threshold 53 indicating net costs to compression, the compression control output 54 of the compression controller 52 may provide a signal (shown here as low state) to the compressor 24 to cease compressing incoming cache lines.

When the general trend is that the benefits of compression exceed the cost of compression, compression will continue until the cost tend to exceed the benefits. The historical window over which the costs and benefits are compared may be controlled by controlling the number of bits of the counter 50.

Referring now to FIG. 6, semi-continuous control over compression may be obtained by use of a compression controller 52 which does not simply compare the value of counter 50 against a threshold 53 in a binary fashion, but considers a difference 82 between threshold 53 and the current value of output 51 of counter 50. This analog difference 82 may be impressed on compression control output 54, for example, by changing the duty cycle of the wave form produced by compression control output 54 controlling compression so that the ratio of the duration in time during which compression control output 54 indicates compression, the duration in time during which compression control output 54 indicates no compression is a function of the difference 82 at that time. Alternatively or similarly, the difference 82 may affect a weighting of a random number generator used to determine the on-times of the compression control output 54.

Referring now to FIG. 7 in an alternative embodiment the compression, controller 52 may invoke several different compression systems having a range of compression ratios and compression time costs or latencies. Here a series of zones 84 may be created and when the output of counter 50 lies within a given zone, a different output 86 may be provided selecting a different compression algorithm. The compression control output 54 is shown here as an analog signal but alternatively could be provided by multiple parallel bits.

The above embodiment uses a predictor that evaluates the benefits of compression of the entire cache. It will be understood to those of ordinary skill in the art, from this description, that different granularities of prediction and/or multiple predictors also may be used, for example, predictors associated not simply with a single cache but multiple caches or portions of caches, or associated with processors, sets of processors or portions of processors.

As the benefits of compression increase, more aggressive compression algorithms are used providing increased compression possibly with increased decompression times, whereas when the costs of compression increase, no compression or less aggressive compression algorithms are used with lower compression or less de-compression overhead.

The size of the counter 50 with respect to the cost and benefit increments, can be adjusted to control the time window considered for the prediction. A large counter prevents short bursts of costs or benefits from degrading the long run behavior of the device. The absolute size of the counter 50 may be controlled by normalizing the cost and benefit values, for example, by dividing them all by a common value.

The decompressors 26 and compressor 24 may use any of a number of different compression methods all sharing the common feature of loss-lessly compressing data. A simple compression system may, for example, recognize data values of zero and simply compress these values from eight segments 35 to a single segment suitable for holding this value. Ambiguity between a compressed data value of zero and a longer data word having zero as its least significant bit is resolved by the tag information which provides a demarcation between compressed data lines through the tags and the compression state bit 42 compression size bits 44.

Similarly any data value that does not require high order bits that would use more significant segments 35 may be correspondingly truncated. Two's compliment numbers may be readily handled by preserving the sign bit and truncating the converted. Generally loss-less compression may be realized by recognizing repeating patterns in the segments 35 and provide an indication of that repetition without actually storing each of the repetitions. A number of different compression techniques are described in the art including: Alaa R. Alameldeen and David A. Wood, Frequent Pattern Compression: A Significance-Based Compression Scheme for L2 Caches, *Technical Report* 1500, Computer Sciences Department, University of Wisconsin-Madison, April 2004; R. B. Tremaine, P. A. Franaszek, J. T. Robinson, C. O. Schulz, T. B. Smith, M. E. Wazlowski, and P. M. Bland, IBM Memory Expansion Technology (MXT). *IBM Journal of Research and Development,* 45(2):271-285, March 2001; Peter Franaszek, John Robinson, and Joy Thomas. Parallel Compression with Cooperative Dictionary Construction. In *Proceedings of the Data Compression Conference, DCC'96*, pgs. 200-209, March 1996; Morten Kjelso, Mark Gooch, and Simon Jones. Design and Performance of a Main Memory Hardware Data Compressor. In *Proceedings of the 22$^{nd}$ EUROMICRO Conference,* 1996; Daniel Citron and Larry Rudolph. Creating a Wider Bus Using Caching Techniques. In *Proceedings of the First IEEE Symposium on High-Performance Computer Architecture*, pgs 90-99, February 1995; Luca Benini, Davide Bruni, Bruno Ricco, Alberto Macii, and Enrico Macii. An Adaptive Data Compression Scheme for Memory Traffic Minimization in Processor-Based Systems. In *Proceedings of the IEEE International Conference on Circuits and Systems, ICCAS*-02, pgs. 866-869, May 2002; Matthew Farrens and Arvin Park. Dynamic Base Register Caching: A Technique for Reducing Address Bus Width. In *Proceedings of the 18$^{th}$ Annual International Symposium on Computer Architecture*, pgs. 128-137, May 1991; Luca Benini, Davide Bruni, Alberto Macii and Enrico Macii. Hardware-Assisted Data Compression for Energy Minimization in Systems with Embedded Processors. In *Proceedings of the IEEE Design Automation and Test in Europe*, pgs. 449-453, 2002; Paul Wilson, Scott Kaplan, and Yannis Smaragdakis. The Case for Compressed Caching in Virtual Memory Systems, Proceedings of the USENIX Annual Technical Conference, pgs. 101-116, 1999; all hereby incorporated by reference.

It is specifically intended that the present invention not be limited to the embodiments and illustrations contained herein, but include modified forms of those embodiments including portions of the embodiments and combinations of elements of different embodiments as come within the scope of the following claims.

We claim:

1. A cache system for use with an electronic computer comprising:
    a cache memory;
    a data compressor controllably compressing data to be stored in the cache memory;
    a data decompressor decompressing compressed data stored in the cache memory; and
    a predictor communicating with the data compressor to control compression of data to be stored in the cache memory according to a predicted effect of the compression of data on a speed of execution of a program using the data, based on a current utilization of the cache memory by the program.

2. The cache recited in claim 1 wherein the data compressor can be switched by the predictor between compressing or not compressing the data to be stored in the cache.

3. The cache recited in claim 1 wherein the data decompressor includes a bypass allowing uncompressed data to bypass the data decompressor reducing latency for uncompressed data stored in the cache memory.

4. The cache recited in claim 2 wherein the predictor creates a prediction value indicating a predicted effect of compression on the speed of execution, and wherein the predictor controls the data compressor to compress the data when the prediction value is above a predetermined amount and to not compress the data when the prediction value is below the predetermined amount.

5. The cache recited in claim 2 wherein the predictor creates a prediction value indicating a predicted effect of compression of the speed of execution, and wherein the predictor controls the data compressor to switch between compressing the data and not compressing the data so as to create an average compression being a semi-continuous function of the prediction value.

6. The cache recited in claim 1 wherein the data compressor can be switched by the predictor between multiple degrees of compression having different latency.

7. The cache recited in claim 1 wherein the predictor compares a cost and benefit of compression over a predetermined previous time.

8. The cache recited in claim 7 wherein the predictor is a counter tallying historical time saved and lost attributable to compressed data in the cache memory.

9. The cache recited in claim 8 wherein the predictor tallies a time saved when data accessed would not have been held in the cache but for compression, and tallies a time lost when the data is compressed, but would have been held in the cache regardless of compression.

10. The cache recited in claim 8 wherein the predictor tallies a time saved when data was not in the cache, but could have been in the cache with more compression.

11. The cache recited in claim 1 wherein the cache includes tag data indicating compressed lengths of associated line data.

12. The cache recited in claim 11 wherein the tag data indicates a compressed size of associated line data regardless of whether the line data is compressed.

13. The cache recited in claim 1 wherein the cache includes tag data indicating whether associated cache data is compressed.

14. The cache recited in claim 1 wherein the data compressor identifies small magnitude data values and compresses them by truncating unused more significant data storage elements.

15. The cache recited in claim 1 wherein the data compressor identifies common data patterns and replaces them with abbreviated patterns to compress the data.

16. The cache recited in claim 15 wherein the common data patterns include low magnitude numbers, zero, and repeated data blocks.

17. The cache recited in claim 1 also includes a second cache memory reading from the cache memory.

18. The cache recited in claim 17 further including a victim cache holding data expelled from the second cache memory.

19. A method of operating a cache memory in an electronic computer comprising the steps of:
    (a) monitoring access of the cache memory;
    (b) based on the monitoring of step (a) predicting an effect of compressing data in the cache on a speed of execution of a program using the data of the cache memory, based on a current utilization of the cache memory by the program; and
    (c) compressing selected data stored in the cache memory based on a prediction of step (b); and
    (d) repeating steps (a)-(c) to update the prediction during operation of the electronic computer in executing the program.

20. The method recited in claim 19 wherein the step (c) of compressing the data selects between compressing or not compressing the data to be stored in the cache according to the prediction.

21. The method recited in claim 20 wherein the step (c) of compressing the data compresses the data when the prediction is above a predetermined threshold and does not compress the data when the prediction is below the predetermined threshold.

22. The method recited in claim 20 wherein the step (c) of compressing the data switches between compressing the data and not compressing the data so as to create an average compression being a semi-continuous function of the prediction.

23. The method recited in claim 19 wherein the step (c) of compressing the data selects between multiple degrees of compression having different latency.

24. The method recited in claim 19 wherein the step (b) of predicting compares an historical cost and benefit of compression over a predetermined previous time.

25. The method recited in claim 24 wherein the step (b) of predicting tallies historical time saved and lost attributable to compressed data in the cache memory.

26. The method recited in claim 25 wherein the step (b) of predicting tallies a time saved when data accessed would not have been held in the cache but for compression, and tallies a time lost when the data is compressed but would have been held in the cache regardless of compression.

27. The method recited in claim 25 wherein the step (b) of predicting tallies a time saved when data was not in the cache but could have been in the cache with more compression.

28. The method recited in claim 19 wherein step (c) of compressing identifies small magnitude data values and compresses them by truncating unused more significant data storage elements.

29. The method recited in claim 19 wherein step (c) of compressing identifies common data patterns and replaces them with abbreviated patterns to compress the data.

30. The method recited in claim 29 wherein the common data patterns include low magnitude numbers, zero, repeated data blocks.

* * * * *

UNITED STATES PATENT AND TRADEMARK OFFICE
CERTIFICATE OF CORRECTION

PATENT NO. : 7,412,564 B2  Page 1 of 1
APPLICATION NO. : 11/265975
DATED : August 12, 2008
INVENTOR(S) : Wood et al.

It is certified that error appears in the above-identified patent and that said Letters Patent is hereby corrected as shown below:

IN THE SPECIFICATION

Col. 3, line 67    Replace "available" with --available.--.

Col. 5, line 3     Replace "pass" with --passed--.

Col. 7, line 37    Replace "date" with --data--.

Col. 9, line 3     Replace "considered" with --considered.--.

Signed and Sealed this

Twenty-fourth Day of November, 2009

David J. Kappos
*Director of the United States Patent and Trademark Office*